(12) United States Patent
Lee

(10) Patent No.: US 10,692,538 B2
(45) Date of Patent: *Jun. 23, 2020

(54) METHOD AND PROGRAM FOR GENERATING RESPONSIVE IMAGE

(71) Applicant: Chul Woo Lee, Seoul (KR)

(72) Inventor: Chul Woo Lee, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,867

(22) Filed: May 9, 2019

(65) Prior Publication Data

US 2020/0105305 A1    Apr. 2, 2020

Related U.S. Application Data

(63) Continuation of application No. 15/892,877, filed on Feb. 9, 2018, now Pat. No. 10,332,563, which is a continuation of application No. PCT/KR2016/008876, filed on Aug. 12, 2016.

(30) Foreign Application Priority Data

Aug. 13, 2015 (KR) .......................... 10-2015-0114668
Aug. 11, 2016 (KR) .......................... 10-2016-0102562

(51) Int. Cl.
  *H04N 9/80* (2006.01)
  *G11B 27/10* (2006.01)
  *G11B 27/00* (2006.01)
  *G06F 3/0488* (2013.01)

(52) U.S. Cl.
  CPC .......... *G11B 27/102* (2013.01); *G11B 27/005* (2013.01); *G06F 3/0488* (2013.01)

(58) Field of Classification Search
  CPC .......... H04N 5/93; G11B 27/10; G11B 27/00; G06F 3/0488
  USPC .......................... 386/240, 239, 278, 248, 343
  See application file for complete search history.

(56) References Cited

U.S. PATENT DOCUMENTS

2011/0164860 A1* 7/2011 Nakagawa ............. H04N 5/772
                                                                386/343
2013/0136413 A1* 5/2013 Mizuno .................. H04N 5/783
                                                                386/230

* cited by examiner

*Primary Examiner* — Robert Chevalier
(74) *Attorney, Agent, or Firm* — Studebaker & Brackett PC

(57) ABSTRACT

A method and program for generating a responsive image is provided. The method includes obtaining, by a computer, a first image, receiving, by the computer, an input for specifying a specific playback range, and specifying playback range, the playback range corresponding to an entire interval or a partial interval in the first image, connecting, by the computer, a specific input operation to an entire region or a specific region of one or more image frames included in the playback range. The input operation adjusts movement of the image frames in the playback range and corresponds to motion of an object of the playback range in the first image. The computer connects an image captured by a typical image capture device to a specific input operation such that a user feels as if the image detects and responds to his or her input operation upon playback.

12 Claims, 14 Drawing Sheets

METHOD AND PROGRAM FOR GENERATING RESPONSIVE IMAGE

CROSS-REFERENCE TO RELATED APPLICATIONS

This application is a continuation of U.S. patent application Ser. No. 15/892,877, filed Feb. 9, 2018, now allowed, which is a continuation of International Patent Application No. PCT/KR2016/008876, filed Aug. 12, 2016, which is based upon and claims the benefit of priority to Korean Patent Application No. 10-2015-0114668, filed Aug. 13, 2015 and Korean Patent Application No 10-2016-0102562, filed Aug. 11, 2016. The disclosures of the above-listed applications are hereby incorporated by reference herein in their entirety.

BACKGROUND

Embodiments of the inventive concept described herein relate to a method and program for generating a responsive image, and more particularly, relate to a method and program for generating an image capable of being played back on a variable basis depending on an input operation of a user who views an image.

Recently, image capture technology has been very developed. A mobile terminal, such as a smartphone as well as a camcorder or a digital camera, may capture an image of high resolution. Further, a 360-degree camera, a three-dimensional (3D) camera, or the like have appeared.

Images may be captured and stored into a specific format by an image capture device and may be played back by a playable terminal. The playback of images may be unilaterally provided in order of time without interacting with a viewer. In other words, the viewer may feel only visual sense through images which are played back.

SUMMARY

Embodiments of the inventive concept provide a method and program for generating a responsive image to match an input operation of a user with a frame of a playback image and generate the responsive image such that the user feels as if an image responds to the input operation input by the user upon image playback.

According to an aspect of an embodiment, a method for generating a responsive image may include obtaining, by a computer, a first image, receiving, by the computer, an input for specifying a specific playback range, and specifying playback range, the playback range corresponding to an entire interval or a partial interval in the first image, connecting, by the computer, a specific input operation to an entire region or a specific region of one or more image frames included in the playback range. The input operation may adjust movement of the image frames in the playback range and may correspond to motion of an object of the playback range in the first image.

The playback range may include the one or more image frames including the object which moves from a first point to a second point. The input operation may be an operation which moves from the first point to the second point. The connecting of the specific input operation may include matching each image frame included in the playback range to an image corresponding to the input operation.

The connecting of the specific input operation may include generating a virtual layer combined on the one or more image frames in the playback range, dividing the virtual layer into a specific number of detailed cells, and matching a corresponding specific frame to each detailed cell.

The connecting of the specific input operation may include recognizing a specific feature point included in the object in each image frame, generating a movement path of the object based on the feature points in consecutive image frames, and generating a virtual layer including a plurality of detailed cells, the plurality of detailed cells being generated by dividing between the feature points of the consecutive image frames.

The generating of the virtual layer may include, when a motion path of the object is a curve rather than a straight line, calculating a straight line in which the sum or standard deviation of vertical distances to the curve is minimal and generating the virtual layer including a plurality of detailed cells which are divided to be perpendicular to the straight line.

The generating of the virtual layer may include, when a motion path of the object is a curve rather than a straight line, obtaining the motion path of the object, generating a reference line which is perpendicular to a tangent at a specific point on the motion path corresponding to the object in a specific image frame and passes through the specific point, calculating a detailed cell division line which divides between the adjacent reference lines, and generating the virtual layer including a plurality of detailed cells generated based on the detailed cell division line.

The first image may include a plurality of playback ranges in which different motion is performed in a state where the object is located on a specific location. The connecting of the specific input operation may include obtaining input operations respectively corresponding to the plurality of playback ranges and connecting each of the input operations to an image frame in each of the plurality of playback ranges.

The plurality of playback ranges may include one or more image frames including the object which moves from a first point to another point. The input operation may be an operation which moves from the first point the other point. The connecting of the specific input operation may include overlapping and generating a plurality of virtual layers corresponding to each input operation, each of the plurality of virtual layers of which is configured with a specific number of detailed cells matched to a plurality of image frames included in each playback range.

The connecting of the specific input operation may include matching each of the image frames to intensity of the input operation or duration of the input operation.

The method may further include setting an image playback condition according to the input operation.

The dividing of the virtual layer may include, when a speed at which the object moves is changed in a playback range in the first image, generating, by the computer, a plurality of detailed cells at different sizes based on a location of the object in consecutive image frames.

According to another aspect of an embodiment, a program for generating a responsive image may be combined with hardware to execute the method for generating the responsive image and may be stored in a medium.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
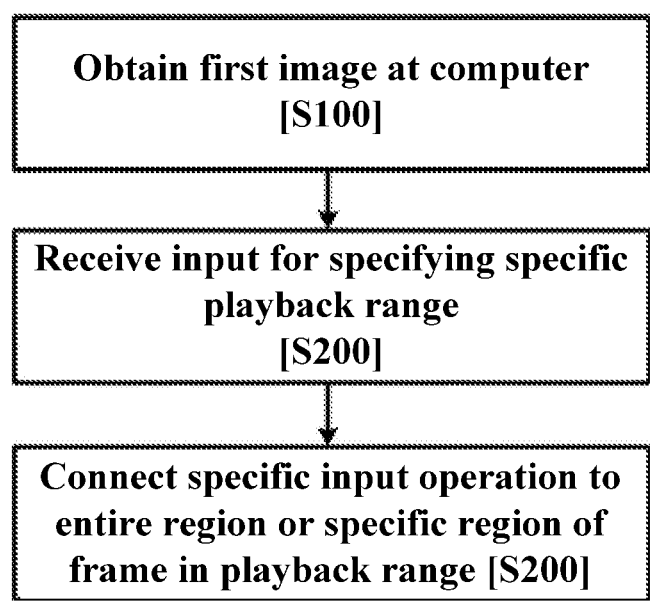
FIG. 1 is a flowchart illustrating a method for generating a responsive image according to an embodiment of the inventive concept.

Hereinafter, a description will be given in detail of exemplary embodiments of the inventive concept with reference to the accompanying drawings. Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims. Like reference denotations refer to like elements throughout the specification.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements.

The term "responsive image" in the specification may refer to an image which responds to an input operation by a user. In other words, the term "responsive image" may refer to an image which is played back in a form corresponding to a specific input operation of a user (i.e., a viewer) who views the image. For example, the term "responsive image" may refer to an image which is played back as if an object in a corresponding image is moved (e.g., played back while a user's hand is moved according to a drag operation of the user, moved from a first point to a second point), as the user performs an operation (e.g., as the user's hand is dragged from the first point to the second point on a screen in a frame where the first point is located on a moving image) after an operation of the user (e.g., an operation dragged from the first point to the second point) corresponding to the specific motion of the specific object in a captured original image (e.g., motion of the hand which appears in the moving image) is connected.

The term "computer" in the specification may include various devices capable of performing arithmetic processing. For example, the term "computer" may correspond to a smartphone, a tablet personal computer (PC), a cellular phone, a personal communication service (PCS) phone, a synchronous/asynchronous international mobile telecommunication-2000 (IMT-2000) mobile terminal, a palm PC, a personal digital assistant (PDA), or the like as well as a desktop PC or a note book. Further, the term "computer" may correspond to a server computer which receives information from a client. Hereinafter, the term "computer" in the specification may be represented as a terminal.

The term "input operation" in the specification may refer to an operation for an image of the user, received through an input means of a computer which plays back a responsive image. For example, the term "input operation" may include an operation (e.g., a click operation, a drag operation, a contact touch operation, or a force touch operation (i.e., a touch operation of providing specific pressure to a touch screen or a touch pad)) capable of being input to a specific point or region in an image through an input means such as a mouse or a touch screen. Further, for example, the term "input operation" may include an arrangement state, motion, or the like of the terminal itself, which is able to be obtained by using a sensor (e.g., an acceleration sensor, a gyro sensor, or the like) of a computer (or terminal) as an input means.

The term "first image" in the specification may refer to an original image to which an input operation of the user is not connected. For example, the term "first image" may correspond to an image which is captured and generated into a specific format by an image capture device. The term "second image" in the specification may refer to a responsive image generated by matching an input operation of the user with a specific playback region.

Hereinafter, a description will be given of a method for generating a responsive image, a method for playing back the response image, and a program using the same, according to embodiments of the inventive concept, with reference to the accompanying drawings.

FIG. 1 is a flowchart illustrating a method for generating a responsive image according to an embodiment of the inventive concept.

Referring to FIG. 1, the method for generating the responsive image according to an embodiment of the inventive concept may include obtaining (S100) a capture image, receiving (S200) an input for specifying a specific playback range, and connecting (S300) a specific input operation to the entire region or a specific region of a frame 210 in the playback range. The method for generating the responsive image according to an embodiment of the inventive concept will be described in order.

In operation S100, a computer 100 may obtain a captured first image 200. The computer 100 may read the first image 200 which is previously captured and stored or may immediately receive the first image 200 captured by an image capture device. The computer 100 may receive the captured first image 200 through a wired connection or wireless communication from the image capture device. Further, when the computer 100 includes the image capture device (e.g., when the computer 100 includes a camera like a smartphone), it may obtain the first image 200 through direct image capture. The image capture device may include all of devices capable of capturing an image.

The first image 200 may be a two-dimensional (2D) image or a three-dimensional (3D) image. When the first image 200 is the 2D image, it may correspond to a 360-degree image.

In operation S200, the computer 100 may receive the input for specifying the specific playback range from a user. The playback range may refer to a specific range to be implemented as a responsive image in the entire frame of the first image 200 (i.e., an original image). The computer 100 may receive an input for setting a playback range in various manners from the user.

As an embodiment, the computer 100 may allow the user to select the first image 200 from a specific start frame (i.e., the initial frame 210 of a time domain to be made as a responsive image) to a final frame (i.e., a final frame of the time domain to be made as the responsive image). Further, as another embodiment, the computer 100 may allow the user to specify a time range.

In operation S300, the computer 100 may connect a specific input operation to the entire region or a specific region of the frame 210 in the playback range. In other words, the computer 100 may connect an input operation corresponding to motion of an object 220 in a specified playback range to the entire region or the specific region of the frame 210.

The computer 100 may connect the input operation and may store a second image as a separate video file, and may generate and store a responsive image generation file for implementing the first image 200 as the second image. For example, the responsive image generation file may be a generation file played back concurrently with video playback and may be played back concurrently with playback of the first image 200 to make the first image 200 as a responsive image.

In operation S300, the computer 100 may directly receive an input operation to be connected to the responsive image from the user. For example, when the computer 100 is a device having a touch screen, it may provide a process of receiving a specific input operation and may receive the specific input operation along an object which moves on the touch screen in the process. Further, the computer 100 may allow the user to select a type of an input operation to be connected to the responsive image and may receive an operation capable of replacing the type of the input operation. For example, when a user uses a computer which is a device which generates a second image for being played back on a device having a touch screen and does not have the touch screen, the computer may receive a mouse operation rather than a touch operation on the touch screen and may generate the second image (i.e., a responsive image).

The input operation may be identical to or correspond to motion of an object included in a playback range. A location or region set to receive the input operation may correspond to a region corresponding to motion of an object in a frame included in the playback range.

Various manners may be applied to a manner of connecting the object with the input operation. As an embodiment of a manner of connecting a specific input operation with a playback range, the computer 100 may apply a manner of generating a virtual layer 300 on the entire region or a specific region of each frame 210 in a specified playback range. The virtual layer 300 may refer to a layer overlapped with the frame 210 configuring the first image 200, which is capable of receiving an input of the user without being visually represented on a screen.

Figure 2:
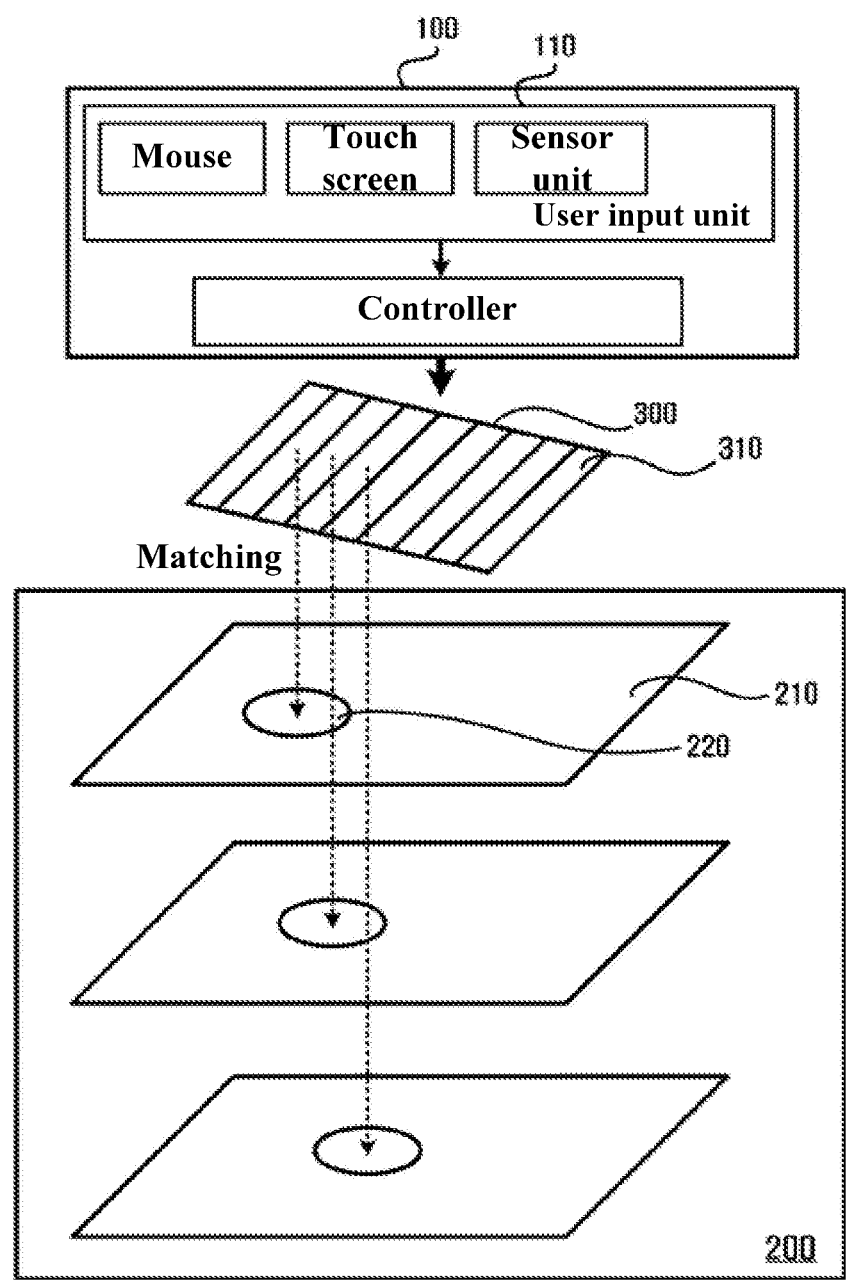
FIG. 2 is a drawing illustrating a process of generating a virtual layer on a first image according to an embodiment of the inventive concept.
Figure 3:
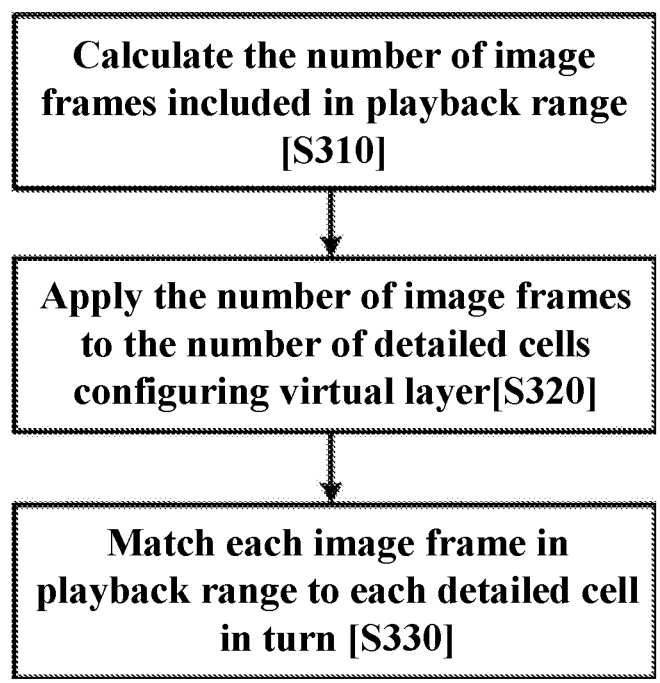
FIG. 3 is a flowchart illustrating a method for connecting a playback range with a specific input operation using a virtual layer according to an embodiment of the inventive concept.

When the input operation is an operation moved on a specific region (i.e., a path where an object is moved in a playback range) on a frame (e.g., mouse cursor movement through a mouse operation or a drag operation from a first point to a second point on a touch screen), as shown in FIG. 2, the computer 100 may generate the virtual layer 300 configured with a specific number of detailed cells 310 on the frame 210.

Figure 4:
FIG. 4 is a drawing illustrating a responsive image with which a virtual layer rotated by a specific angle is combined, according to an embodiment of the inventive concept.

Various manners may be applied to a manner where a computer 100 of FIG. 1 generates a virtual layer 300 configured with a plurality of detailed cells 310 in a playback range. As an embodiment, in operation S310, the computer 100 may calculate the number of image frames included in the playback range. In operation S320, the computer 100 may apply the number of the image frames to the number of the detailed cells 310 configuring the virtual layer 300. In operation S330, the computer 100 may match each frame in the playback range to each detailed cell 310 in turn. For example, when the computer 100 wants to generate an image such that n frames are played back on a variable basis (i.e., operated and played back) according to an input operation of a user, it may divide a specific region into n detailed cells 310. Thereafter, the computer 100 may match each image frame 210 to each of the divided n detailed cells 310. If a specific detailed cell is selected or specified, the computer 100 may provide the matched image frame 210. In other words, as shown in FIG. 4, when an object (e.g., a hand) is moved in a specific direction and when a virtual layer is generated along a movement path of the object, the computer 100 may match each detailed cell 310 to each frame in a playback range in order from the detailed cell 310 of a first point where the object starts to move.

Further, the computer 100 may generate the plurality of detailed cells 310 configuring the virtual layer 300 at different sizes or intervals. When a speed at which an object moves is changed in a playback range of a first image 200 and when the virtual layer 300 is divided into detailed cells, each of which has the same size, a location of the object on a frame may fail to fit locations of the detailed cells. Thus, the computer 100 may differently change sizes or intervals of the detailed cells to correspond to motion of the object. In other words, since the computer 100 obtains image frames of an object moved at a speed changed at intervals of the same time upon video playback, a location of the object in consecutive image frames may become wide in space in a quickly moving interval and a location of the object in consecutive image frames may become narrow in space in a slow interval. Thus, the computer 100 should generate the plurality of detailed cells 310 to correspond to a space of the object in such image frames such that a location of an input operation the user inputs may be matched with a location of the object in the image frames.

For example, the computer 100 may recognize a location of a specific feature point of an object in each frame (e.g., locations of fingertips when a hand is moved) and may project the location of the feature point in each frame on the virtual layer 300, thus dividing between the locations of the feature points to generate the plurality of detailed cells 310. Thus, the computer 100 may configure arrangement of detailed cells which are most suitable for motion of the object in the playback range.

Further, the computer 100 may determine a length of the virtual layer 300. As an embodiment, the computer 100 may ascertain a location of each object (or a specific feature point of the object) in a playback range and may recognize a path where the object moves. The computer 100 may form the virtual layer 300 with a length including the path. Further, as another embodiment, the computer 100 may allow the user to specify a first point on an initial frame and specify a second point on a final frame to set a range of the virtual layer 300. Further, the computer 100 may allow the user to select points corresponding to an object on one or more frames located in the middle of a playback range and may connect the plurality of points selected by the user in order of time when each of the frames is played back, thus generating the virtual layer 300 with a length including the plurality of points.

Further, the computer 100 may determine a form of the virtual layer 300 and a form of each of the detailed cells 310. As an embodiment, as shown in FIG. 4, the detailed cells 310 may be generated as cells perpendicular to a specific operation direction. For example, when generating the rectangular virtual layer 300 on a specific region of the frames 210 in a specified playback range, the computer 100 may generate the plurality of detailed cells 310 by dividing the virtual layer 300 in a direction perpendicular to a first direction such that an input operation (i.e., a drag or swipe operation) is generated in the same direction as the first direction where the specific object 220 moves in the first image 200. Further, as shown in FIG. 4, when a motion direction of the object 220 in an image is not a horizontal or vertical direction, the computer 100 may rotate and generate the virtual layer 300 such that a motion path of the object 220 is perpendicular to a longitudinal direction (i.e., a direction of a long side) of the detailed cells 310.

Figure 5:
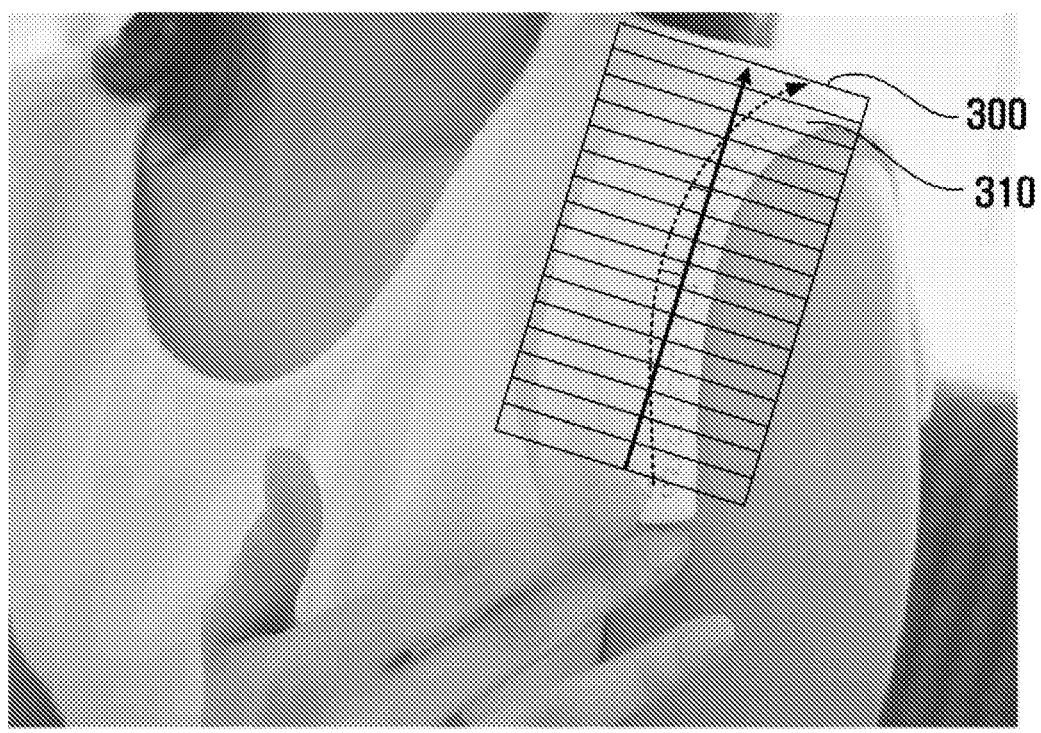
FIG. 5 is a drawing illustrating a responsive image in which a virtual layer is generated based on a straight line which approximates to a motion path of a curve, according to an embodiment of the inventive concept.

Further, as shown in FIG. 5, when a motion path of the object 220 is a curve rather than a straight line, the computer 100 may calculate a straight line with the least error with the curve and may arrange the virtual layer 300 to divide the virtual layer 300 to be perpendicular to the straight line to generate the detailed cells 310. For example, the computer 100 may calculate a straight line in which the sum or standard deviation of vertical distances from a curve corresponding to a motion path is minimal and may arrange two sides of the rectangular virtual layer 300 to be parallel to the straight line, thus dividing the virtual layer 300 in a direction perpendicular to the straight line.

Figure 6:
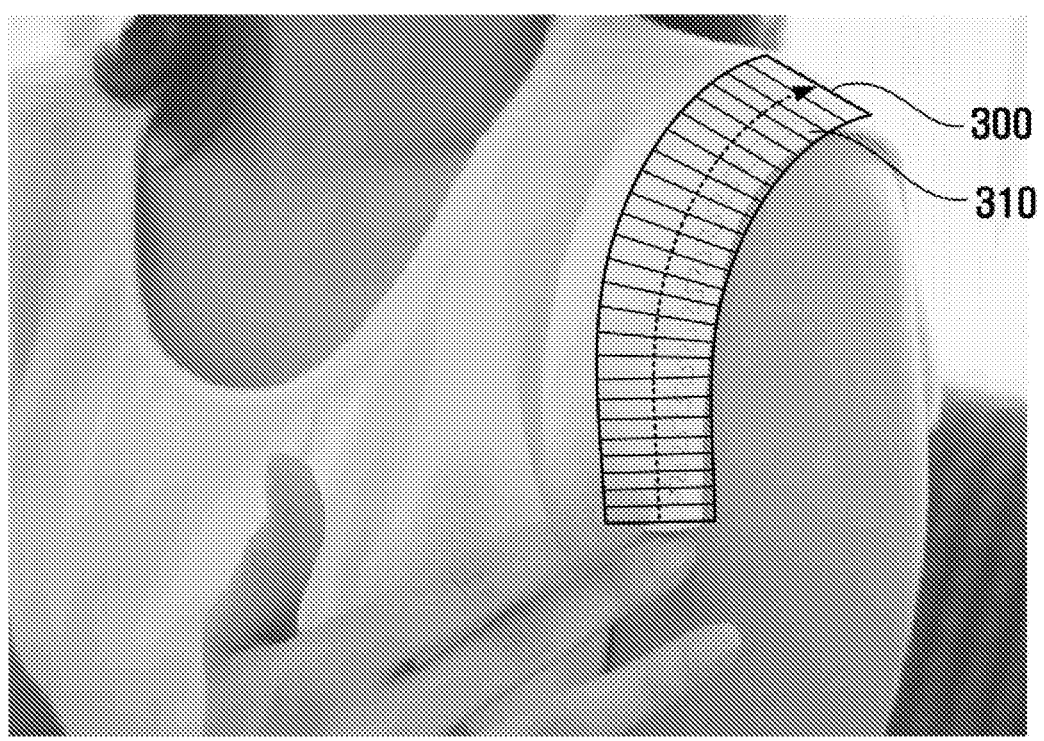
FIG. 6 is a drawing illustrating a responsive image in which a virtual layer is generated using the motion path itself of a curve, according to an embodiment of the inventive concept.

Further, as shown in FIG. 6, when a motion path of the object 220 is a curve rather than a straight line, the computer 100 may generate the virtual layer 300 as a specific figure rather than a rectangular shape and may divide the detailed cells 310 into irregular shapes. Further, when the motion path of the object 220 is the curve rather than the straight line, the computer 100 may generate a line which is perpendicular to a tangent at a specific point of the motion path (i.e., a movement path) of the object 220 and passes through the specific point and may divide between adjacent lines to calculate a detailed cell division line.

After generating the virtual layer 300 of a specific length or form, the computer 100 may match each image frame 210 to each of the divided detailed cells 310 to correspond to an operation way or an operation direction. For example, in case of a playback range where a hand moves, frames may be matched to the specific detailed cells 310 corresponding to a location of the hand in the specific frame 210 in turn from the frame 210 where motion of the hand is started.

Further, the computer 100 may match an operation for several motion to one region. For example, the computer 100 may receive a plurality of images where different motion is performed in a state where the object 220 to be captured is equally located on a specific location (i.e., a state where the object 220 is located on a first point in a frame) and may connect different image or different time frames in the first image 200 depending on an input user operation. For example, after an image where a hand moves to a bag is played back, one of an image where the hand touches the bag after the hand is in contact with the bag and an image of opening the bag with the hand may be determined and connected by an input operation of the user.

When different motion continues depending on an input operation of the user in the same arrangement state, the computer 100 may store a plurality of images, each of which has different motion, at another playback time in one moving image. For example, the computer 100 may generate a moving image by starting the first image 200 (e.g., an image of touching a bag in a horizontal direction) after 5 minutes and starting a second image (e.g., an image of opening the bag in a vertical direction) after 8 minutes and may immediately move an image to a corresponding time as a specific operation is input, thus playing back the frames respectively matched to the detailed cells 310 in turn. To implement a responsive image which connects to several operations from one frame based on the one first image 200, the computer 100 may allow the user to specify a specific frame to start continuing according to a form of each input operation.

Figure 7:
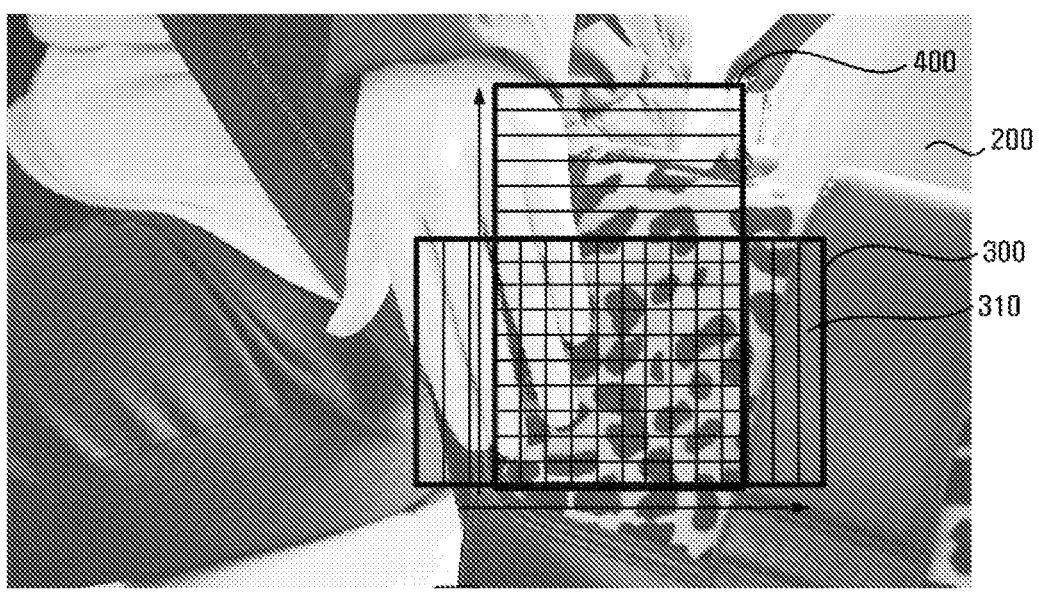
FIG. 7 is a drawing illustrating a responsive image in which a plurality of virtual layers are overlapped and generated, according to an embodiment of the inventive concept.

As an embodiment of implementing a responsive image which is connected to different motion according to an input operation of the user in the same arrangement state, the computer 100 may overlap and generate the plurality of virtual layers 300 with a specific region of the frame 210 in a playback range. For example, as shown in FIG. 7, according to a manner of overlapping and generating the plurality of virtual layers 300, an image of touching a bag in a horizontal direction may be connected to a first virtual layer 300 configured with the vertically divided detailed cells 310, and an image of opening the bag in a vertical direction may be connected to the second virtual layer 400 configured with the horizontally divided detailed cells 310.

Figure 8:
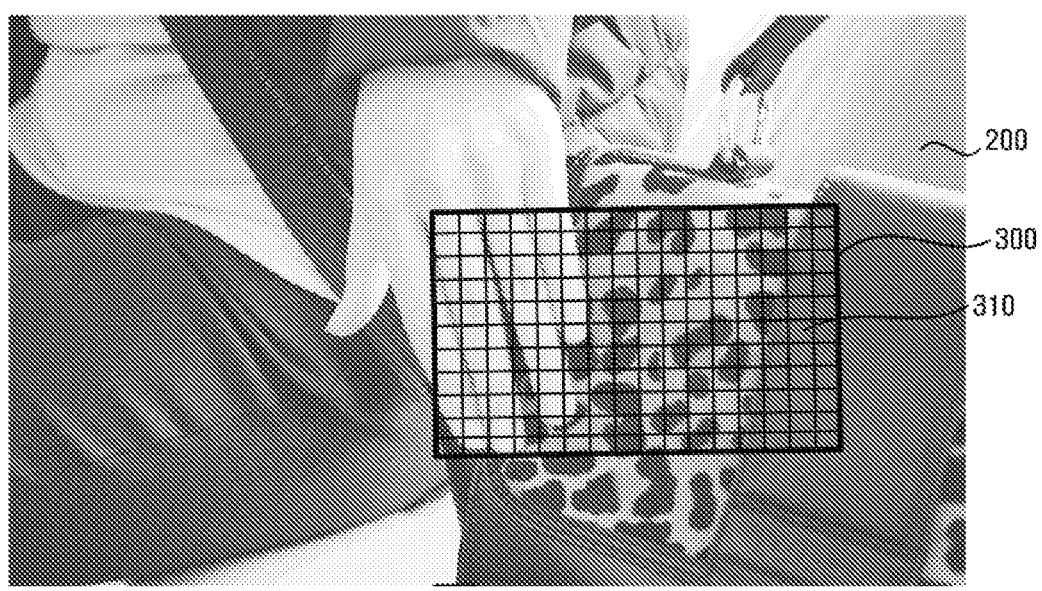
FIG. 8 is a drawing illustrating a responsive image in which a virtual layer is divided and combined in a plurality of directions, according to an embodiment of the inventive concept.

As another embodiment, as shown in FIG. 8, the computer 100 may divide and generate the one virtual layer 300 in several directions. In other words, the computer 100 may generate the virtual layer 300 divided in a first direction (i.e., a horizontal direction) and a second direction (i.e., a vertical direction) and may combine the generated the virtual layer 300 with the first image 200. When a specific input operation (i.e., an operation of swiping in a specific direction through a touch operation) is received in a corresponding playback range which is a responsive image from the user, the computer 100 may determine whether the input operation is close to any of the first direction and the second direction and may subsequently provide an image frame corresponding to the determined direction.

Further, to play back an image corresponding to an operation for a specific direction in a matched order, the computer 100 may determine an operation direction based on the detailed cell 310 where an input operation is first received and the detailed cell 310 where a subsequent input operation is received and may play back the frames which are connected and matched to a specific image where the virtual layer 300 corresponding to the operation direction is generated among a plurality of images.

Figure 9:
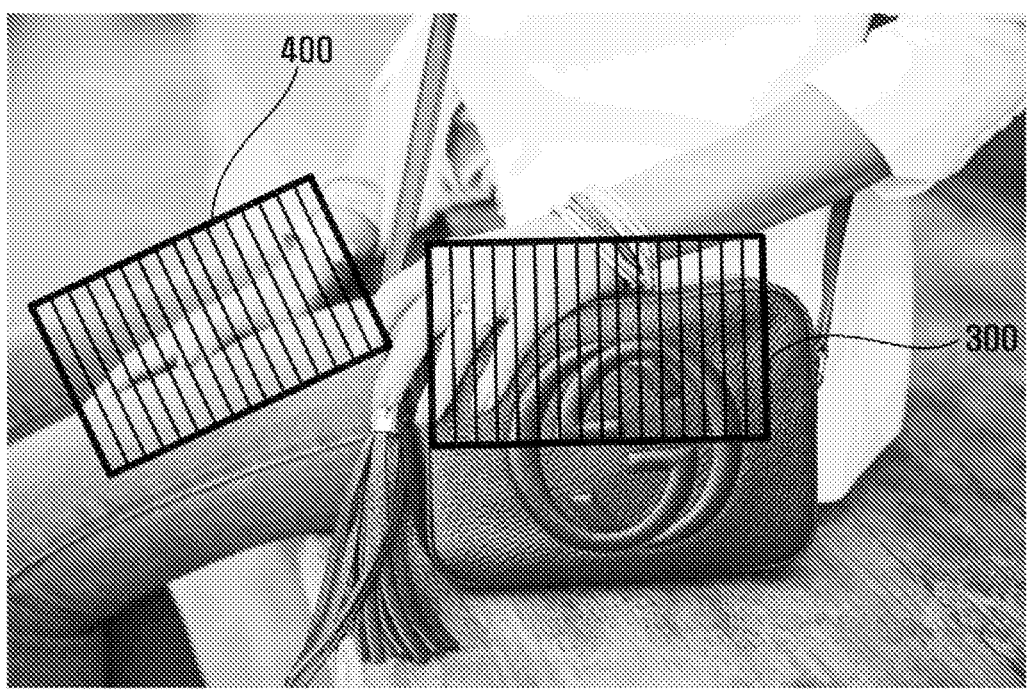
FIG. 9 is a drawing illustrating an image in which virtual layers are respectively generated on different objects in the same frame, according to an embodiment of the inventive concept.

Further, as shown in FIG. 9, the computer 100 may play back the frames which are connected and matched to different images in turn depending on respective input operations on the plurality of objects 220 located on different regions from the specific frame 210. For example, when respective operations (or motion) for a right hand and a left hand are included in an image, the computer 100 may store a plurality of images having different motion at a different playback time in one video file and may move the frame 210 where an operation is started to a playback time when the virtual layer 300 corresponding to an input operation is generated by including virtual layers (e.g., the first virtual layer 300 and the second virtual layer 400) in a plurality of regions, thus playing back frames matched according to an operation input on the virtual layer 300 in turn.

Figure 10:
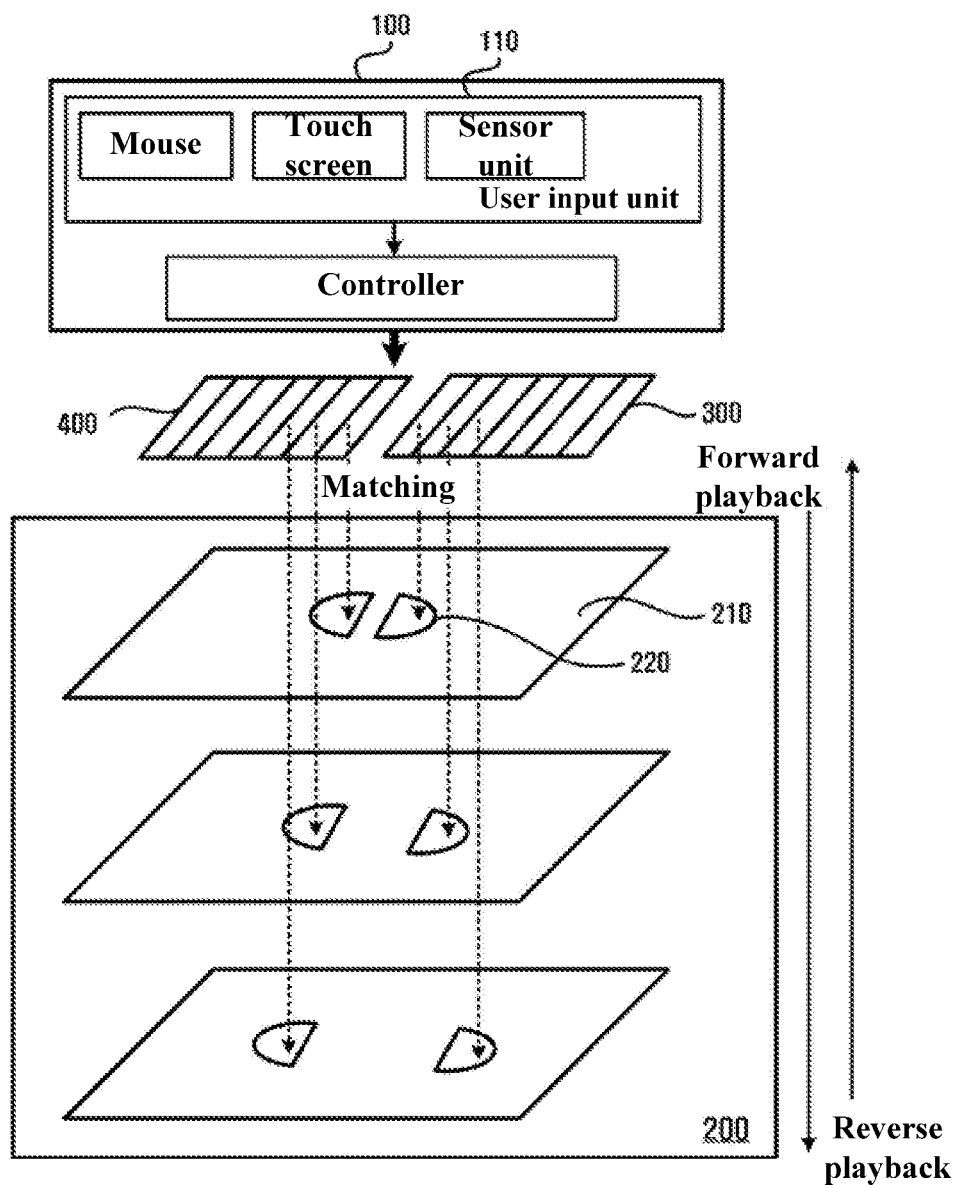
FIG. 10 is a drawing illustrating a process of matching an input operation with a frame with respect to a plurality of virtual layers according to an embodiment of the inventive concept.
Figure 11:
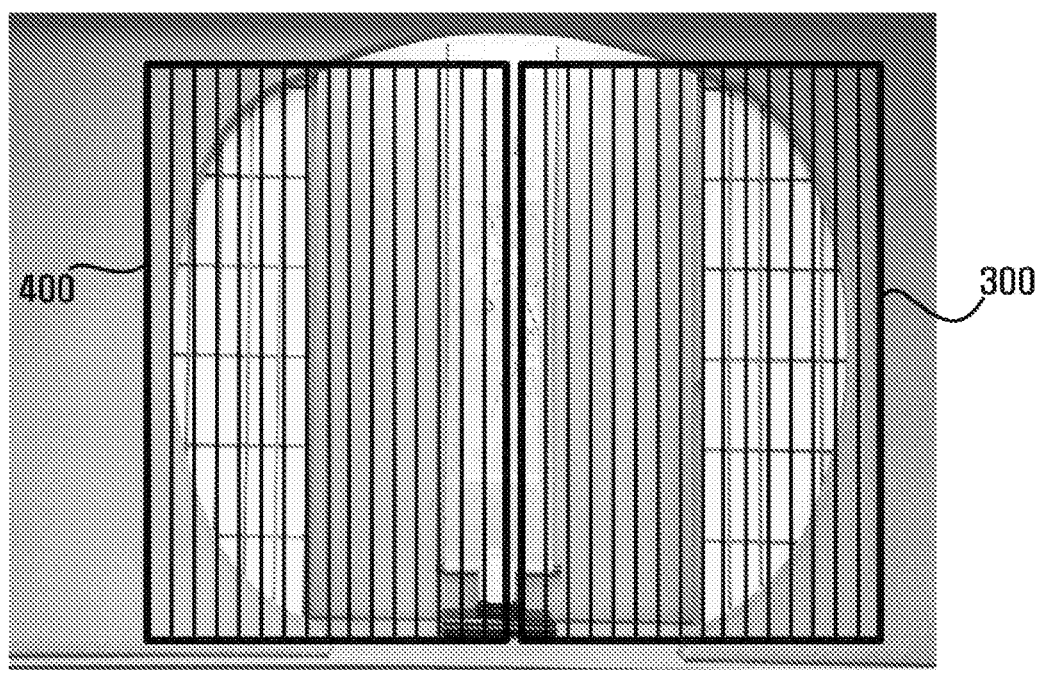
FIG. 11 is a drawing illustrating an image in which a virtual layer is generated on each sliding door which is opened in both directions, according to an embodiment of the inventive concept.

As shown in FIG. 10, when a virtual layer 300 is generated on a specific region rather than the entire region of a frame 210, a computer 100 may generate a plurality of virtual layers 300 and 400 respectively corresponding to different regions in the frame 210 in the same playback range. For example, as shown in FIG. 11, the computer 100 may generate the plurality of virtual layers 300 and 400 on respective regions moved in one playback region (e.g., both regions of a fruit which is split in half, both regions of a sliding door which is opened in both directions, or the like) to be suitable for an image of splitting the fruit in half, an image of opening the sliding door in both directions, or the like. In this case, the computer 100 may match a plurality of objects 220 in each frame 210 to detailed cells 310 in the plurality of virtual layers 300 and 400. Thus, operations for the plurality of virtual layers 300 and 400 should be simultaneously met upon playback such that frames matched to the detailed cells 310 are played back in turn.

Figure 12:
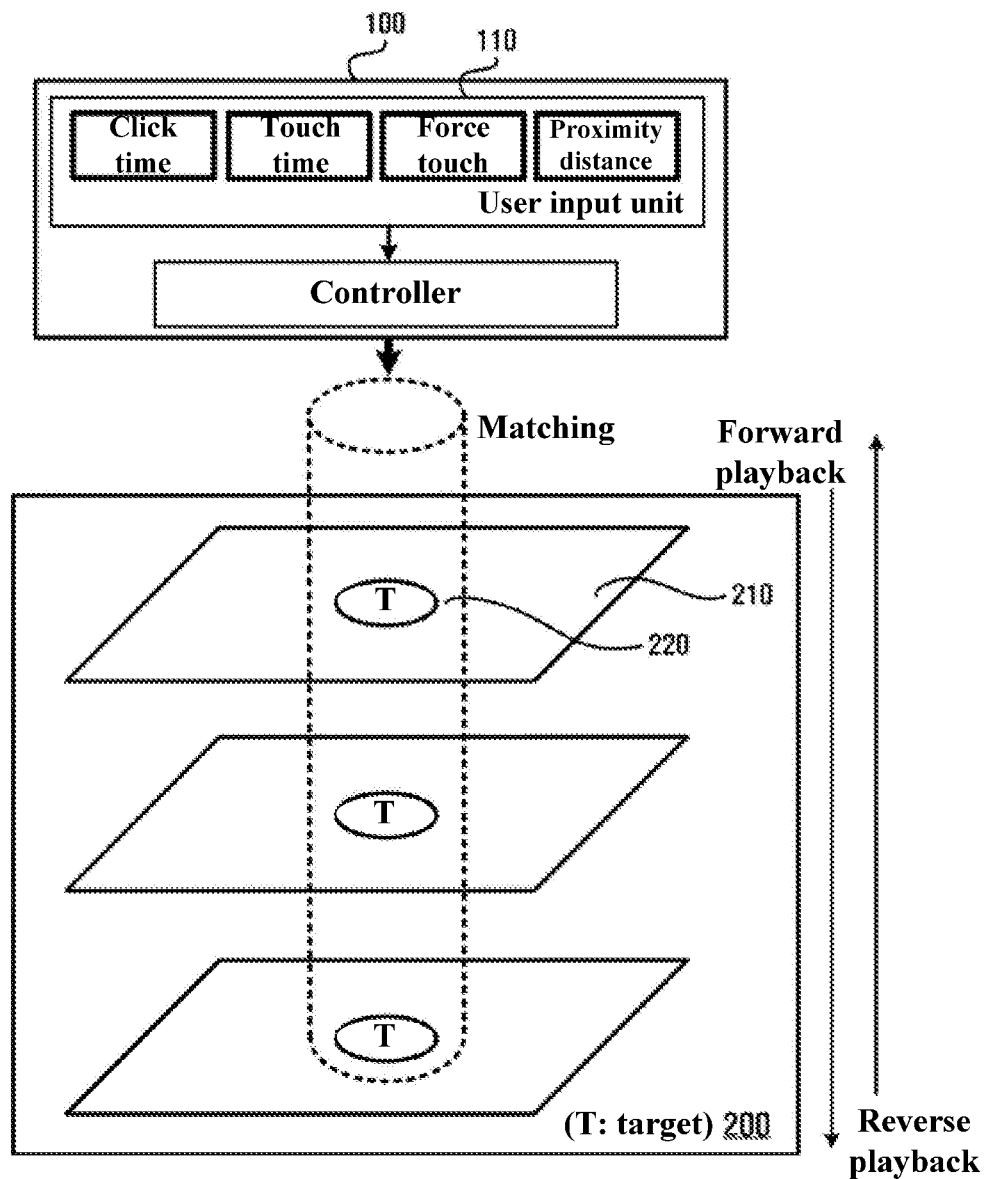
FIG. 12 is a drawing illustrating a process of matching each frame to intensity or duration of an input operation according to an embodiment of the inventive concept.
Figure 13:
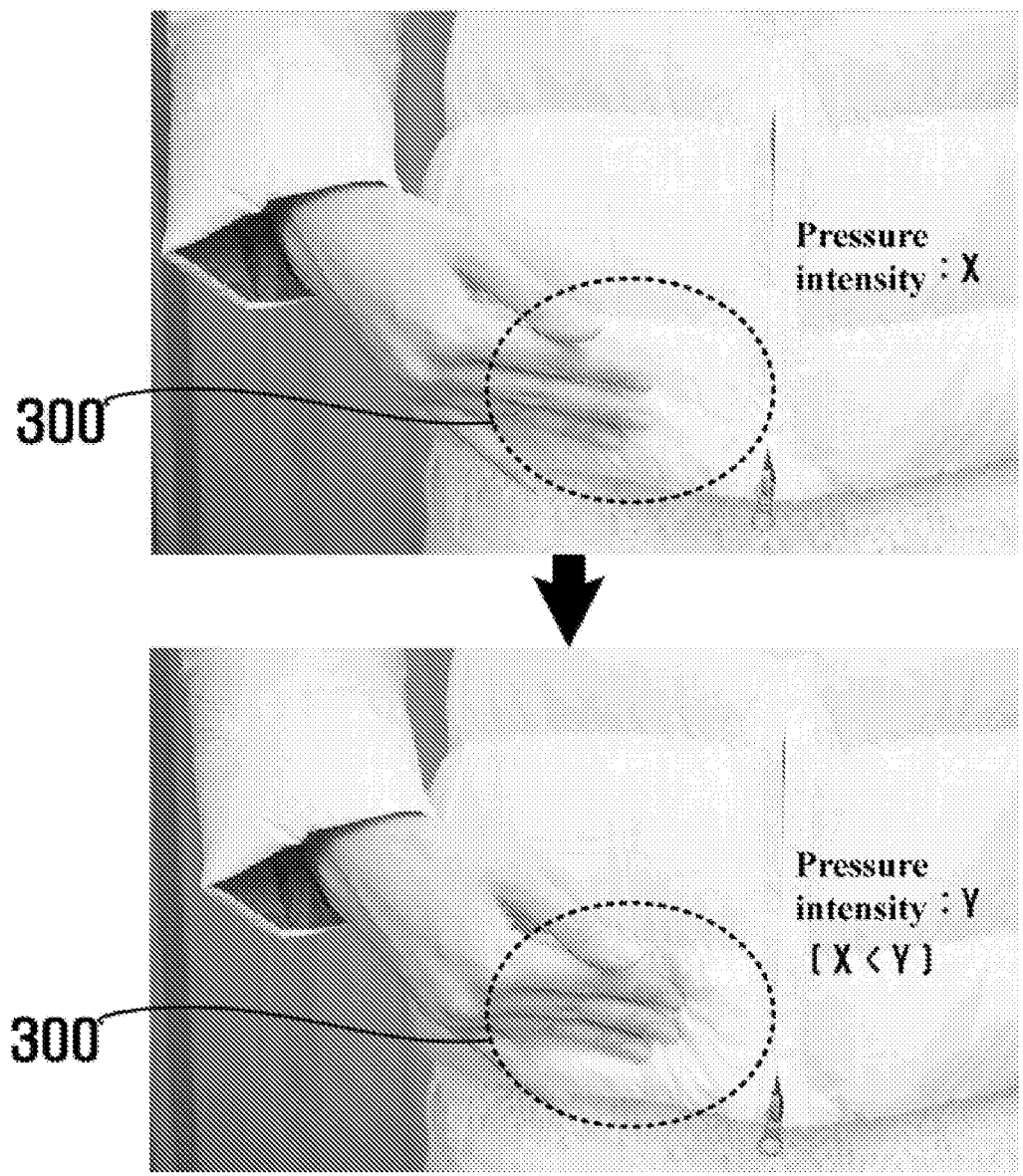
FIG. 13 is a drawing illustrating a change in frame according to intensity of a force touch according to an embodiment of the inventive concept.

As another embodiment of a manner of connecting a playback range to a specific input operation, as shown in FIG. 12, each frame 210 may be matched for each intensity of an input operation (e.g., a force touch, a click, or the like), each duration of an input operation (e.g., a touch, a click, or the like), or each proximity distance to a screen. For example, when a force touch is applied, the frame 210 may be matched to intensity of pressure input on a touch screen of a terminal which plays back an image. For example, as shown in FIG. 13, an image of pressing thick clothes may be matched to pressure intensity in turn from the frame 210 before the clothes are pressed to the frame 210 where the clothes are pressed maximally in the image. Thus, there may be an effect in which a user may actually feel as if he or she directly presses an object 220 of an image.

Further, for example, the computer 100 may match each frame 210 to a length of an elapsed time when a specific point of the frame 210 is pressed. As an embodiment, the computer 100 may extract a specific time length (e.g., a real playback time of a playback range) and may calculate the number of image frames included in the playback range. Thereafter, the computer 100 may divide the time length by the number of the image frames to calculate a unit time and may match each image frame to each unit time in turn. Thus, the computer 100 may implement a responsive image according to a time length of an input operation provided by the user. Further, as another embodiment, when a specific input operation of the user is received, the computer 100 may start to play back an image and may play back the image again in a reverse direction when the input operation is stopped before arriving at a specific time (i.e., a time corresponding to a final frame of a playback range).

As another embodiment of a manner of connecting the playback range with the specific input operation, each frame 210 may be matched to an arrangement state of a terminal which plays back a second image. For example, the frame 210 in each playback range may be matched to a specific angle recognized by a gyro sensor of the terminal which plays back the image. Particularly, when an angle value upon image capture is measured by a gyro sensor of an image capture device and when a received image is stored together with the measured angle value, each frame 210 may be matched to an actually captured angle.

A computer 100 may determine or recommend an input operation suitable for a corresponding playback range rather than receiving an input operation to be connected to the playback range from a user. In other words, in operation S300, the computer 100 may analyze motion of an object which appears in the playback range and may select or recommend an input operation corresponding to the motion of the object. For example, the computer 100 may recognize an image as an operation where clothes are pressed and may automatically match each frame 210 of the image to pressure intensity according to a force touch. Further, for example, when a specific playback region is set by the user, the computer 100 may determine a moving object and may generate a virtual layer 300 on a region for operating the object. The computer 100 may generate detailed cells 310 in a proper direction and may automatically match each of the detailed cells 310 to each frame 210. Further, when a specific body portion moves in a playback range, the computer 100 may measure a joint direction and a motion path of the body portion and may set a path of a proper input operation (e.g., a drag or swipe operation).

Figure 14:
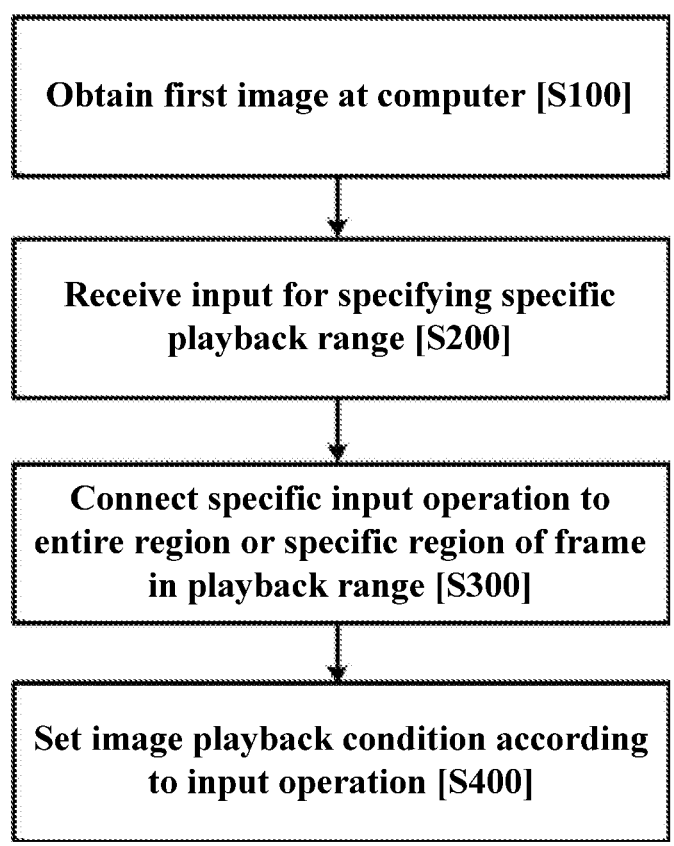
FIG. 14 is a flowchart illustrating a method for generating a responsive image to set an image playback condition according to an input operation according to an embodiment of the inventive concept.

Further, as shown in FIG. 14, a method for generating a responsive image according to an embodiment of the inventive concept may further include setting (S400) an image playback condition according to the input operation. The image playback condition may include a manner where an image is played back according to an input operation of the user, an effect accompanied upon playback, or the like.

As an embodiment, when arriving at a specific condition depending on a request of the user, the computer 100 may set a condition such that forward playback continues from a subsequent frame. For example, the computer 100 may generate an image to perform reverse playback when a specific press input does not continue during a specific time and proceed with forward playback using a subsequent image when the input continues during the specific time. In detail, as shown in FIG. 13, when a playback range is an image where a person presses an object (e.g., a bubble jacket) having specific volume and when an input operation of a specific time or intensity or more is not provided to a location where clothes are pressed, an image frame may be played back in a reverse direction such that a pressed object may be played back in the form of being expanded again. On the other hand, when the input operation of the specific time or intensity or more is provided, the computer 100 may provide a subsequent frame. The subsequently provided frame may be a frame which is connected on time in a moving image in a playback range and may be a frame, a location of an object on space of which is subsequently connected, without being connected on time in the moving image.

Further, the computer 100 may set a condition such that forward playback and reverse playback are repeated according to a request of the user. For example, the computer 100 may set a condition to perform forward playback while an input operation is provided and perform reverse playback when the input operation is stopped. Further, for example, when a touch operation is performed in a specific direction, the computer 100 may set a condition to perform forward playback when the touch operation is performed in a first direction and perform reverse playback when the touch operation is performed in a second direction.

Further, the computer 100 may set a condition in the specific frame 210 in an image to provide an output suitable for motion of a specified playback range. For example, when an operation of touching a bag by a drag or swipe operation is included, the computer 100 may provide haptic vibration when an input operation is provided. Further, for example, when each frame 210 is matched to intensity of pressure pressed, the computer 100 may set a condition in each frame 210 such that vibration of corresponding stronger intensity occurs as the intensity of the pressure is higher.

The method for generating and playing back the responsive image according to an embodiment of the inventive concept may be implemented as a program (or application) which is combined with hardware to be executed and may be stored in a medium.

For the computer 100 to read the program and execute the methods implemented with the program, the above-mentioned program may include a code coded into a computer language such as C, C++, Java, or a machine language readable through a device interface of the computer 100 by a processor (CPU) of the computer 100. Such a code may include a functional code associated with a function and the like defining functions necessary for executing the methods and may include a control code associated with an execution procedure necessary for the processor of the computer 100 to execute the functions according to a procedure. Further, such a code may further include a code associated with memory reference about whether additional information or media necessary for the processor of the computer 100 to execute the functions is referred at any location (address number) of an internal or external memory of the computer 100. Further, if it is necessary for the processor of the computer 100 to communicate with any computer or server located in a remote place to execute the functions, the code may further include a communication related code about how communication is performed with any computer or server located in a remote place using a communication module of the computer 100 and whether to transmit and receive any information or media upon communication.

The medium may refer to a device-readable medium which stores data on a semipermanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the computer 100 or various storage media on the computer 100 of the user. The medium may be distributed to a computer system connected over a network and may store a computer-readable code on a distributed basis.

An embodiment of the inventive concept may have the following various effects.

First, the computer may connect an image (i.e., a first image) captured by a typical image capture device to a specific input operation such that the user feels as if the image detects and respond to an input operation of the user upon playback. In other words, the computer may transmit sensory experiences of stroking, applying, cutting, moving, or pressing a target (i.e., an object) in a responsive image to the user.

Second, the computer may enhance interest rates of viewers on an image and may optimize the power of delivery. Thus, the computer may increase the effect of public relations on a specific object in an image.

Finally, when generating an image, such as an image of stroking an object, of shuttling between specific intervals or repeating a specific operation, the computer may obtain only a partial image which moves in a specific first direction and may perform repeated playback (e.g., repeat forward playback and reverse playback) depending on an input operation of the user. Thus, the computer may reduce capacity of storing an image including a repeated operation.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for generating a responsive image depending on an input operation of a user, the method comprising:
    obtaining, by a computer, a first image;
    receiving an input for specifying a specific playback range, wherein the playback range corresponds to an entire interval or a partial interval in the first image; and
    connecting a specific input operation to an entire region or a specific region of one or more image frames included in the playback range,
    wherein the input operation adjusts movement of the image frames in the playback range and corresponds to motion of an object of the playback range in the first image.

2. The method of claim 1, wherein the playback range comprises the one or more image frames including the object which moves from a first point to a second point,
    wherein the input operation is an operation which moves from the first point to the second point, and
    wherein the connecting of the specific input operation comprises:
    matching each image frame included in the playback range to a region corresponding to the input operation.

3. The method of claim 2, wherein the connecting of the specific input operation comprises:
    generating a virtual layer combined on the one or more image frames in the playback range;

dividing the virtual layer into a specific number of detailed cells; and matching a corresponding specific frame to each detailed cell.

4. The method of claim 1, wherein the connecting of the specific input operation comprises:

recognizing specific feature points included in the object in each image frame;

generating a movement path of the object based on the feature points in consecutive image frames; and generating a virtual layer including a plurality of detailed cells, the plurality of detailed cells being generated by dividing between the feature points of the consecutive image frames.

5. The method of claim 3, wherein the generating of the virtual layer comprises:

when a motion path of the object is a curve rather than a straight line, calculating a straight line in which a sum or standard deviation of vertical distances to the curve is minimal; and generating the virtual layer including a plurality of detailed cells which are divided to be perpendicular to the straight line.

6. The method of claim 3, wherein the generating of the virtual layer comprises:

when a motion path of the object is a curve rather than a straight line, obtaining the motion path of the object;

generating a reference line which is perpendicular to a tangent at a specific point on the motion path corresponding to the object in a specific image frame and passes through the specific point;

calculating a detailed cell division line which divides between the adjacent reference lines; and generating the virtual layer including a plurality of detailed cells generated based on the detailed cell division line.

7. The method of claim 1, wherein the first image comprises a plurality of playback ranges in which different motion is performed in a state where the object is identically located on a specific location, and wherein the connecting of the specific input operation comprises:

obtaining input operations respectively corresponding to the plurality of playback ranges; and connecting each of the input operations to an image frame in each of the plurality of playback ranges.

8. The method of claim 7, wherein the plurality of playback ranges comprise one or more image frames including the object which moves from a first point to another point, wherein the input operation is an operation which moves from the first point the another point, and wherein the connecting of the specific input operation comprises:

overlapping and generating a plurality of virtual layers corresponding to each input operation, each of the plurality of virtual layers of which is configured with a specific number of detailed cells matched to a plurality of image frames included in each playback range.

9. The method of claim 1, wherein the connecting of the specific input operation comprises:

matching each of the image frames to intensity of the input operation or duration of the input operation.

10. The method of claim 1, further comprising:

setting an image playback condition according to the input operation.

11. The method of claim 3, wherein the dividing of the virtual layer comprises:

when a speed at which the object moves is changed in a playback range in the first image, generating, by the computer, a plurality of detailed cells at different sizes based on a location of the object in consecutive image frames.

12. A non-transitory computer-readable medium, having stored thereon a program to perform the method of claim 1.

* * * * *